3,140,303
ALLYLIC OXY COMPOUNDS AND THEIR
PRODUCTION
Harold E. De La Mare, El Cerrito, Jay K. Kochi, Berkeley, and Frederick F. Rust, Orinda, Calif., assignors to Shell Oil Company, New York, N.Y., a corporation of Delaware
No Drawing. Filed May 8, 1961, Ser. No. 108,255
14 Claims. (Cl. 260—408)

This invention relates to the synthesis of allylic oxy compounds, that is, ethers and hydroxy compounds having an ether or hydroxyl group linked to a saturated carbon atom to which a carbon atom of an ethylenic group is directly attached. It provides an economical method for manufacture of compounds of this type, many of which are new compounds having advantageous properties.

It has been found that these useful products can be produced by generating an organic free radical in the presence of a diene and a solubilizing hydroxy solvent for the reactants provided a controlled amount of cupric ion is maintained in the reaction mixture. This is contrary to what would have been expected since the reactions which have been previously reported to take place between organic free radicals and dienes have almost always involved substantial dimerization of an initially formed adduct of the diene and organic free radical. See for example Coffman et al. Patents U.S. 2,671,810 and 2,811,551 and Smith Patent U.S. 2,820,813. Hatchard et al. have described (Journal of the American Chemical Society, volume 80, pages 3636 and 3640, July 20, 1958) reactions of dienes with free radicals derived from poly-tertiary butyl phenols which depart from this general rule as a result of cyclization or other reactions of the initial adducts between the dienes and organic free radicals of the phenols. These are exceptional reactions which are quite different from that of the present invention which proceeds in a different way to produce a different type of product. Due to the presence of a controlled amount of cupric ion in the reaction, there is produced, instead, a monoethylenic oxy compound formed from a combination of one mole each of the organic free radical, diene and hydroxy solvent. The oxy group in these compounds will be in allyl position with respect to the ethylenic double bond which is a structure imparting particularly useful properties to the new products. The overall reaction, when using a conjugated diene which undergoes 1,2-addition, can be represented by the equation:

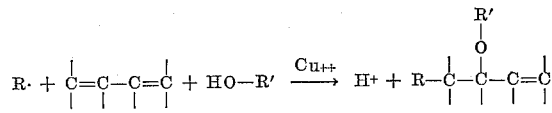

wherein R· represents the organic free radical generated for the reaction and HO—R' represents the hydroxy solvent employed. It will be understood, of course, that the process is not limited to 1,2-addition to the diene. The corresponding products formed by 1,4-addition thereto, e.g.,

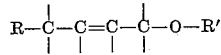

are usually formed simultaneously although generally in lesser amounts along with the 1,2-addition products.

It has been suggested by Lavigne that organic free radicals of the type generated by redox reaction of hydroperoxides derived from cyclic ketones or tertiary alkyl alicyclic alcohols be reacted with an oxidizing agent comprising a salt of a variable valent metal, which may be a cupric salt. See U.S. Patent 2,938,918. The products of this reaction which is carried out in an aqueous alcoholic medium are carboxylic acids, esters or ketones substituted in the omega position by the halogen, cyanide, thiocyanide, benzoate, formate or acetate group which is the anion of the cupric salt employed. In view of these results it was surprising to find that, when a diene is employed in this type of reaction and the amount of cupric salt is properly controlled, allylic oxy compounds can be obtained as products in good yields.

The organic free radicals used in the process can be generated in any desired way. Numerous methods of generating organic free radicals suitable for use according to the invention are known. One particularly advantageous method is decomposition of organic peroxides. Pyrolysis, photolysis or reaction with a redox reducing agent are among the suitable methods of decomposing organic peroxides to produce free radicals for the process of the invention. Another useful method of free radical production is reaction of a peroxide with an organic compound having a removable hydrogen atom. Still other useful methods comprise decomposition of suitable azo and/or carbonyl compounds. Procedures for carrying out these reactions have been described in the literature. The process of the invention is not dependent on the method of free radical generation which is employed since any such method can be used successfully to provide the starting radicals for the new reaction.

A wide variety of dienes can be used for reaction with the organic free radicals according to the invention. Conjugated dienes are especially advantageous because of their greater reactivity in the new process. Particularly preferred compounds are the 1,3-conjugated dienes. Examples of suitable compounds are: 1,3-butadiene; 1,3-pentadiene; isoprene, 1,3-cyclohexadiene; 2,3-dimethyl-1,3-butadiene; 2-phenyl-1,3-butadiene; and 1,3-dodecadiene. Dienes having 4 to 12 carbon atoms per molecule are preferred, especially the hydrocarbon dienes of 4 to 10 carbon atoms. However, substituted dienes, particularly the halo-substituted dienes such, for instance, as chloroprene, 2,3-dichloro-1,3-butadiene and 2-fluoro-1,3-butadiene, can be used in the same way as can those containing other non-reactive substituents such as carboxyl, ether, ester, hydroxyl and like groups. Examples of such substituted dienes which are useful in the process are 2,4-pentadienol and its methyl and ethyl ethers, beta-vinylacrylic acid, and sorbic acid and their methyl and ethyl esters, for instance. Mixtures of two or more dienes can be used instead of the individual compounds.

A number of different hydroxy-containing solvents can be used in the reaction. Where hydroxy products are to be produced, water will be employed as the predominant hydroxy-containing solvent. For production of allylic ether products, on the other hand, one should use the corresponding organic hydroxy compound as the predominant solvent for the reactants. Thus allylic methyl, ethyl, isopropyl, and tertiary butyl ethers can be made by using methyl, ethyl, isopropyl or tertiary butyl alcohols, respectively. Depending on the proportions of alcohol used, one can obtain predominantly mono- or poly-ether products by employing polyhydroxy solvents. With ethylene glycol, for example, either beta-hydroxyethyl ether or dioxyethane compounds can be produced. Other polyols which can be similarly employed are, for instance, propylene glycol, trimethylene glycol, glycerol, pentaerythritol, sorbitol, etc. The preferred hydroxy solvents are the saturated mono- and poly-hydroxy alcohols which are miscible with water to the extent of at least 10 parts per 100 parts of water.

The cupric ions which must be present in order for the new reaction to take place can be derived from any source. Cupric salts soluble in the chosen hydroxy solvent can be used conveniently. Most preferably soluble salts of polybasic sulfate, cupric perchlorate and the like are used, but one can also use cupric salts of monobasic inorganic acids, for instance, cupric nitrate and, less desirably, cupric chloride because of its tendency to form chloro-substituted products under some conditions. Suitable organic cupric salts for use in the process include cupric benzenesulfonate, cupric methanesulfonate, and the like, for example.

As previously indicated it is essential for the success of the new process that the cupric ions be present in critical amounts. Not less than about 0.01 nor more than about 0.6 equivalents of cupric copper should be present in the reaction mixture per mole of free radical precursor used. With lower proportions of cupric ion, the products will be predominantly dimers of the initially formed adduct of the starting free radical and diene rather than the desired allylic oxy compound. With higher proportions of cupric ion, reaction of the initially formed free radical with the diene is inhibited so products of the type provided by the invention are not obtained in commercially significant amounts. Most advantageously the proportion of cupric ion is between about 0.06 and about 0.25 equivalents of cupric ion per mole of free radical precursor employed in the reaction.

It is also desirable to control the proportion of diene which is used. As a rule amounts of diene between about 3.0 and about 100 moles per mole of free radical precursor are suitable, but amounts in the range of about 5 to about 15 moles per mole of free radical precursor are generally more advantageous.

Control of the proportion of hydroxy-containing solvent in the reaction is not so important in the new process but, since this solvent serves as one of the reactants as well as reaction medium, it is necessary to use at least one equivalent of hydroxyl per mole of free radical which is to be reacted therewith. Proportions greater than about 500 moles per mole of free radical precursor employed tend to dilute the reactants excessively and are preferably not used. Most advantageously, proportions between about 10 and about 150 moles of hydroxyl solvent per mole of free radical precursor are employed.

The type of allylic oxy compound which is obtained as product will, of course, be dependent upon the particular free radical which is generated for the reaction as well as upon the diene and hydroxy solvent chosen. One of the more preferred types of organic free radicals is that in which the free bond is attached to a carbon atom which is linked by single bonds to hydrogen or other carbon atoms. This type of free radical can be conveniently generated by decomposition of peroxy compounds, including hydroperoxy compounds, having the peroxy oxygen group linked to a saturated carbon atom to which another carbon atom is directly attached. The decomposition can be carried out as indicated in the following equations in which the successive steps postulated for the reaction are shown separately:

(1) Free radical generation

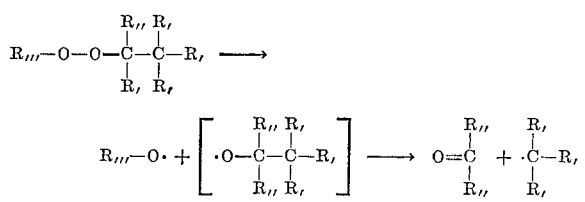

(2) Allylic radical formation, for the sake of simplicity, illustrated as taking place by 1,2-addition only

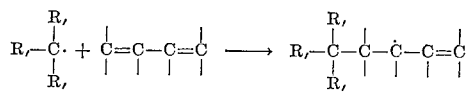

(3) Allylic oxy product formation

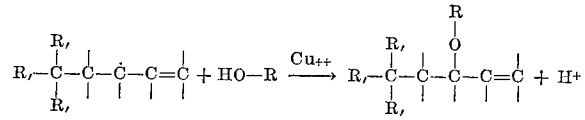

Here, the $R_{,}$'s, which may be the same or different, represent hydrogen or organic radicals each having its free bond attached to a saturated carbon atom. The $R_{,,}$'s represent hydrogen or organic radicals in which the free bonds may be attached to saturated or unsaturated carbon atoms or a radical of a polar group, for instance, a halo, hydroxyl, cyano, alkoxy, carboxy, carbalkoxy or like radical, preferably containing not more than about 10 and most preferably 1 to 4 carbon atoms. Any pair of $R_{,}$'s or pair of $R_{,,}$'s or any $R_{,}$ and $R_{,,}$ can together represent a divalent group in which the two free valence bonds are attached to the same or different carbon atoms. $R$ and $R_{,,,}$ represent hydrogen or an organic group having its free bond linked to a carbon atom. The essential requirement of the starting peroxide is thus that the peroxy oxygen group be linked to a saturated carbon atom which is directly joined to another saturated carbon atom.

It is preferable to use starting peroxy compounds in which at least one $R_{,,}$ is an organic radical because lower yields of the desired intermediate alkyl free radicals are obtained from the oxy free radicals when alpha-hydrogens are present thereon.

When using peroxide compounds in which the $R_{,}$'s are hydrogen or monovalent hydrocarbon groups, or in which two of the $R_{,}$'s together form a divalent hydrocarbon group, the product from a hydrocarbon diene will be an allylic monohydroxy alcohol or ether. Typical of the reactions of this type are the production of 3-methoxyheptene-1 with a smaller amount of 1-methoxyheptene-2 from 1,1-dimethylbutylhydroperoxide and butadiene in methanol solution with ferrous sulfate and cupric sulfate and the production of 1-cyclohexyl-2-methoxybutene-3 and 1-cyclohexyl-4-methoxybutene-2 when 1,1'-dicyclohexylhydroperoxide is used with the same reactants instead of 1,1-dimethylbutylhydroperoxide. By heating under pressure aqueous methanol, cupric sulfate, 2-tert.butylperoxy-2-methyltetrahydropyran and butadiene, one obtains among the products 3-methoxy-8-acetoxy-1-octene and 1-methoxy-8-acetoxy-2-octene.

Starting secondary or tertiary peroxide compounds which have the peroxy oxygen group linked to a carbon atom to which are directly joined a plurality of different groups so that a plurality of free radicals are formed during decomposition will produce a mixture of different allylic oxy compounds in the process of the invention. For instance, by using 3-tert.butylperoxy-3-methylhexane for production of the free radicals by thermal decomposition, for example, reaction with butadiene and ethanol in the presence of the required amount of cupric sulfate yields among the products 3-ethoxy-1-hexene, 1-ethoxy-2-hexene, 3-ethoxy-1-heptene and 1-ethoxy-2-heptene. Ketone by-products from the peroxide decomposition are methyl ethyl ketone and methyl propyl ketone as well as acetone which is produced from the tert.butoxy groups. The proportions of these different allylic oxy products will vary with different starting peroxides and with different conditions of reactions.

There are special advantages in carrying out the process of the invention with a peroxide compound of the previously described formula wherein an $R_{,}$ and an $R_{,,}$ together form a divalent group because in this way valuable allylic oxy carbonyl compounds can be obtained. In this modification of the invention the reaction takes place according to the following equation in which Z represents a divalent group having its two free valence bonds attached to carbon and the other symbols have their previously indicated meaning:

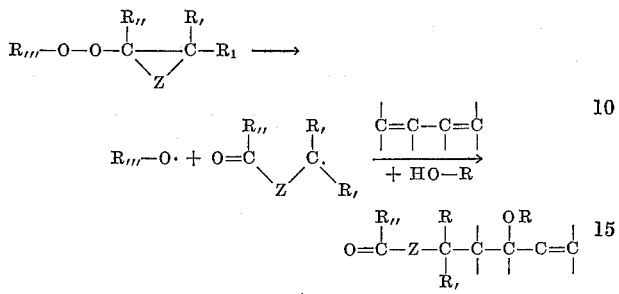

Only 1,2-addition is illustrated although, of course, 1,4-addition will usually also take place as well. By this reaction 10-ketone-3-methoxy-1-undecene and 10-keto-1-methoxy-2-undecene are produced from 1-tert butyl peroxy-1 methylcyclohexane, butadiene and methanol in the presence of cupric sulfate, for example.

While emphasis has been placed on starting peroxides of the indicated types in which the $R_\prime$'s, $R_{\prime\prime}$'s and $R_{\prime\prime\prime}$ are hydrogen or hydrocarbon groups and Z is a divalent hydrocarbon group, this has been for purposes of illustration only. Not only can $R_{\prime\prime}$ represent a polar group, as previously pointed out, but also there may be polar groups such as hydroxyl, cyano, alkoxy, carboxy, halo, etc. attached to hydrocarbon radicals represented by $R_\prime$ and/or $R_{\prime\prime}$ and/or $R_{\prime\prime\prime}$. Examples of suitable substituted peroxides of these kinds are, for instance, bis(1,1-dimethyl-4-hydroxybutyl) peroxide which gives 5-methoxy-6-heptenol and 7-methoxy-5-heptenol together with acetone as products when using butadiene and methanol as the reactants therewith, tert-butyl-3-cyano-tert-amyl peroxide which gives 3-methoxy-6-cyanohexene-1, 1-methoxy-6-cyanohexene-2 and acetone with the same reactants. From 2-tert-butylperoxy-2-methyl-5-methoxyhexane, isoprene and ethanol, for example, by reaction in the presence of the required amount of cupric salt one can obtain 3-methyl-3-ethoxy-7-methoxy-1-octene and acetone as principal products together with a smaller amount of the isomer 3-methyl-1-ethoxy-7-methoxy-2-octene. When reacting 1,1-bis(4-chlorobutylperoxy)-1-phenylethane with isoprene and ethanol under the same conditions the products are 7-chloro-3-ethoxy-3-methyl-1-heptene and 7-chloro-1-ethoxy-3-methyl-2-heptene.

There are special advantages in generating the organic free radicals required for the reaction by reaction of a redox reducing agent with an organic hydroperoxide or organic hydroperoxide precursor, especially a peracetal, hemiperacetal, perketal, hemiperketal or ozonide as hydroperoxide precursor. In this modification of the invention undesirable side reactions are more easily minimized and high yields of the desired products can be obtained economically. Thus a particular and preferred embodiment of the invention comprises reacting an organic hydroperoxide compound having the hydroperoxy group linked to a saturated carbon which is directly joined to another saturated carbon under redox reaction conditions in the presence of a diene, oxy solvent and a cupric compound to produce an allylic oxy product.

The Coffman patents, U.S. 2,671,810 and 2,811,551, previously mentioned describe cyclic peroxides and hydroperoxides which can be used as advantageous sources of organic free radicals for the present invention. In the methods of the patents the products are diketones or dicarboxylic acids or their esters produced by dimerization of the adducts formed by coupling a diene with the redox reduction product of the cyclic peroxy compound. By carrying out the methods of these patents in the presence of an hydroxy solvent and the specified amount of cupric ions according to the invention, the character of the reaction is radically changed and the primary products are allylic alcohol- or ether-substituted monoketones, or monocarboxylic acids or esters thereof.

The peroxide compounds used in this especially preferred modification of the invention, whereby novel products with advantageous properties can be obtained, are those having a cyclic structure consisting of from 4 to 10 carbon atoms in the primary ring. These and other useful peroxide compounds of this type are obtainable, for example, by oxidizing cyclic ketones of the formula

where R is a divalent group containing from 3 to 11 carbon atoms in the unsubstituted portion of the group using hydrogen peroxide as the oxidizing agent. Alternatively these peroxide starting compounds can be made by low-temperature oxidation, with air or oxygen, of the corresponding alcohol or of a cyclic secondary ether of the formula

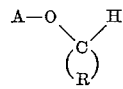

where R has the above-indicated significance and A is a hydrocarbon group, preferably an alkyl of 1 to 8 carbon atoms such as methyl, ethyl, butyl, octyl, etc. The resulting peroxide compounds are hydroperoxides or compounds which hydrolyze to hydroperoxides under the redox reaction conditions. Typical of these peroxides are, for instance, those of the formula

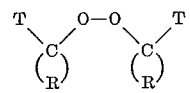

where T is a radical of the group consisting of alkyl, hydroxyl, hydroperoxy, and alkoxy groups, preferably containing 1 to 8 carbon atoms, most preferably not more than 4 carbon atoms. R is a divalent group containing from 3 to 11 carbon atoms in the unsubstituted portion of the divalent group. With all these cyclic peroxide compounds the intermediate free radical is

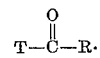

wherein T is one of the previously indicated radicals and R is the bivalent group —R— in the starting cyclic compound as above described. From these intermediate radicals by reaction with a diene containing the group

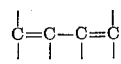

and a hydroxy compound HO-X which is either water or an alcoholic compound, i.e., X is hydrogen, or an organic radical having its free bond attached to a saturated carbon atom to which are directly linked only carbon and/or hydrogen atoms in the presence of a controlled amount of cupric ion in accordance with the invention, one obtains novel carbonyl substituted allylic alcohols or ethers having the formula

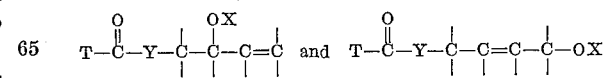

The process of the invention as carried out using redox reaction for decomposition of the starting peroxide compound to produce the required intermediate free radical can be advantageously practiced by intimately mixing the chosen peroxide compound with the diene, cupric compound and oxy solvent and then adding a redox reducing agent. Ferrous ion is a particularly useful redox reducing agent and can be introduced by adding ferrous sulfate or other soluble ferrous salt to the reaction mixture. However, any of the many other known redox reducing agents can be used instead of or together with the ferrous ions in the new process. Suitable examples of such reducing agents include the lower valence form of ions of other heavy metals which are capable of existence in several valence states such as cobaltous, manganous, cuprous, titanous, chromous, vanadous and like ions, as well as sodium bisulfite, 1-ascorbic acid, sodium formaldehyde sulfoxylate, the reducing sugars, etc. The reducing agent or mixture of reducing agents used is employed in an amount equivalent to or, preferably, in a small excess of, for instance, up to about 10% excess over, the stoichiometric requirement for reduction of the peroxide compound being used as a source of organic free radicals. Instead of a stoichiometric amount of ferrous ions, one can, if desired, use in the process a trace of a multivalent metal, preferably ferrous or ferric ion together with another of the aforementioned other reducing agents in stoichiometric amount which will serve to reduce the ferric ion to ferrous ion as fast as the ferric ion is formed. Ferrous ion is the preferred promoter in this type of operation. In either case, a temperature of about −20° C. to about 150° C. can be used although it is generally preferable to employ temperatures of about −20° to about +20° C. in order to minimize loss of diene either through volatilization or polymerization. Amounts of diene in excess of the stoichiometric requirement for the desired reaction are usually advantageous although still larger or smaller amounts can be employed. The time of reaction is not critical in this mode of operation and times in the range of about 5 to about 240 minutes are usually satisfactory under the foregoing conditions. It is usually advantageous to carry out the reaction in an acidic environment, preferably achieved by adding a small amount of sulfuric or other strong polybasic acid to the reaction mixture, hydrochloric acid being undesirable for this purpose because of its tendency to cause chlorine addition at the expense of the desired formation of oxy-substituted products.

It should be noted that although, as indicated, cuprous salts can be used as redox reducing agents in the process of the invention and will be oxidized to the cupric form in the process, the resulting cupric ions will not provide the concentration of cupric ions required for production of the allylic oxy-substituted products obtained by the new method.

This modification of the invention is further illustrated by the following examples:

*Example I.—Reaction of Methyl Omega-Caproate Radical With Butadiene, Methanol and Cupric Sulfate*

A mixture of 19.6 g. cyclohexanone (0.2 mole) and 11.5 g. of 30% hydrogen peroxide (0.1 mole) was stirred at room temperature for one half hour. Chilled solutions of 20 ml. concentrated sulfuric acid in 150 ml. methanol and 1.5 g. cupric sulfate in 150 ml. of methanol was then added. The solution was cooled to 0° C. and 85 ml. butadiene was added and the homogeneous solution briefly flushed with nitrogen. A solution of 41.7 g. ferrous sulfate ($FeSO_4 \cdot 7H_2O$) in 400 ml. methanol was added dropwise to the stirred solution at such a rate as to maintain the butadiene refluxing in the Dry Ice Condenser for approximately 1.5 hours. The reaction mixture was stirred at room temperature to allow the butadiene to distill off and the mixture then was poured into 1.5 liters of water. It was extracted with 100 ml. portions of chloroform three times. The combined chloroform extract was dried with sodium sulfate and distilled to yield methyl ω-hexenoate (.8 g., 6%), methyl ω-methoxyhexanoate (0.3 g., 2%), methyl 8-methoxy-9-decenoate (9.7 g., 45%, B.P. 89–90°/1 mm., $n_D^{20}=1.4397$) methyl 10-methoxy-8-decenoate (3.4 g., 16%, B.P. 107–108°/1 mm., $n_D^{20}=1.4462$) and 8-methoxy-9-decenoic acid (1.6 g., 8%, B.P. 134–136°/1 mm., $n_D^{20}=1.4509$).

Analysis for methyl 7-methoxy-9-decenoate ($C_{12}H_{22}O_3$)

|  | Found | Calculated |
|---|---|---|
| C | 67.0, 67.3 | 67.25 |
| H | 10.4, 10.5 | 10.4 |
| Saponification Equiv | 210, 215 | 214 |
| Bromine No. (eq. 100 g.) | 73 | 74.8 |

Methyl 8-methoxydecenoate absorbs in the infra red at 10.1 and 10.8μ characteristic of the vinyl group. The nuclear magnetic resonance spectrum also exhibits proton resonances characteristic of the vinyl group centered at 211 cps. relative to tetramethyl silane internal reference.

Analysis for methyl 10-methoxy-8-decenoate ($C_{12}H_{22}O_3$)

|  | Found | Calculated |
|---|---|---|
| C | 66.9, 67.0 | 67.25 |
| H | 10.4, 10.4 | 10.4 |
| Saponification Equiv | 213 | 214 |
| Bromine No. (eq./100 g.) | 74 | 74.8 |

The infra-red spectrum of methyl 10-methoxy-8-decenoate shows a prominant absorption at 10.3μ characteristic of an unsubstituted trans olefin. Similarly the nuclear magnetic resonance spectrum shows proton resonances of the hydrogens of internal olefins centered at 222 cps. relative to tetramethyl silane.

Analysis for 8-methoxy-9-decenoic acid ($C_{11}H_{20}O_3$):

|  | Found | Calculated |
|---|---|---|
| C | 65.9 | 66.0 |
| H | 10.2 | 10.1 |
| Neutralization Equiv | 212 | 200.3 |
| Bromine No. (eq./100 g.) | 74 | 80 |

*Example II.—Reaction of Omega-Heptanone-2-Radical With Butadiene, Methanol and Cupric Sulfate*

Adding chilled solutions of 20 ml. concentrated sulfuric in 150 ml. methanol and 1.5 g. cupric sulfate containing 8 g. water added to 23 g. 1-methylcyclohexyhydroperoxide (0.2 mole) with cooling to 0° C. followed by addition of 85 ml. butadiene and then 41.7 g. ferrous sulfate heptahydrate in 400 ml. methanol over a period of about 1.5 hours results in a good yield of 3-methoxy-1-undecen-10-one together with a lesser amount of 1-methoxy-2-undecen-10-one which can be recovered in the same way as the products of Example I.

*Example III.—Reaction of Methyl Omega-Caproate Radical With Isoprene, Methanol and Cupric Sulfate*

To a stirred mixture of 59 g. cyclohexonone and 46 g. of 30% hydrogen peroxide is added a solution of 20 ml. concentrated sulfuric acid, 4.5 g. cupric sulfate ($CuSO_4 \cdot 5H_2O$)

and 255 ml. isoprene in 580 ml. of methanol. After cooling the solution to 0° a solution of 83 g. ferrous sulfate in 800 ml. of methanol was added. The workup following the procedure of Example I yielded cyclohexanone (29.2 g.), methyl ω-hexenoate (5.1 g., 10%), methyl ω-methoxyhexanoate (3.7 g., 5%), methyl 8-methoxy-8-methyl-9-decenoate (23.0 g., 27%, B.P.=103–104°/2 mm.,

$n_D^{20}=1.4469$)

methyl 10-methoxy-8-methyl-8-decenoate (6.2 g., 7.2%, B.P.=114–118°/2 mm., $n_D^{20}=1.4512$), 8-methoxy-8-methyl-9-decenoic acid (5.5 g., 6.5%, B.P.=140–144°/2 mm., $n_D^{20}=1.4604$) and residue (14.8 g.) which is primarily the diesters of dimethyl eicosadienedioc acids.

Analysis for methyl 8-methoxy-8-methyl-9-decenoate $(C_{13}H_{24}O_3)$:

|  | Found | Calculated |
|---|---|---|
| C | 68.5, 68.5 | 68.4 |
| H | 10.6, 10.6 | 10.6 |
| Saponification Equiv | 230, 231 | 228.3 |
| Bromine No | 78, 80 | 70 |

The infra-red spectrum of this compound shows a characteristic absorption band at 10.0 and 10.85μ of the vinyl group. The nuclear magnetic resonance spectrum shows a group of proton resonances centered at 210 cps. relative to tetramethyl silane internal reference diagnostic of the vinyl group.

Analysis for methyl 10-methoxy-8-methyl-8-decenoate $(C_{13}H_{24}O_3)$:

|  | Found | Calculated |
|---|---|---|
| C | 68.9 | 68.4 |
| H | 10.7 | 10.6 |
| Saponification Equiv | 224, 226 | 228.3 |
| Bromine No | 73, 74 | 70 |

Analysis for 8-methoxy-8-methyl-9-decenoic acid:

|  | Found | Calculated |
|---|---|---|
| C | 68.5 | 67.3 |
| H | 10.5 | 10.3 |
| Neutralization Equiv | 221 | 214.3 |

*Example.—Reaction of Omega-Formyloxybutane Radical With Isoprene, Ethanol and Cupric Sulfate*

When 2-hydroperoxytetrahydropyran and ethanol are substituted for the 1-methylcyclohexylhydroperoxide and methanol in the method of Example II, the formic acid esters of 3-ethoxy-3-methyloctene-1-ol-8 and 1-ethoxy-3-methyloctene-2-ol-8 are obtained as major products.

*Example V.—Reaction of Methyl Omega-Caproate Radical With Chloroprene, Methanol and Cupric Sulfate*

To a stirred mixture of 19.6 cyclohexanone and 11.5 g. of 30% hydrogen peroxide was added a chilled solution of 10 ml. concentrated sulfuric acid and 3 g. cupric sulfate in 300 ml. methanol. This was followed by the addition of 100 ml. of freshly distilled chloroprene. The dropwise addition of a solution of 41.7 g. ferrous sulfate in 400 ml. methanol was regulated to maintain a reaction temperature of 0° with an ice bath. The homogeneous reaction mixture was worked up in the manner described in Example I to yield methyl ω-chlorohexanoate (2.0 g., 12%) and methyl chloromethoxydecenoate (B.P.=111–118°, 5.1 g., 20%) in addition to polymeric residues.

Analysis for methyl chloromethoxydecenoate $(C_{12}H_{21}O_3Cl)$

|  | Found | Calculated |
|---|---|---|
| C | 58.7 | 57.9 |
| H | 8.5 | 8.52 |
| Cl | 12.7 | 14.24 |
| Saponification Equiv | a 212 | 248.8 | a Corrected for saponified chloride.

*Example VI.—Reaction of Omega-Hexane Radical With Chloroprene, Methanol and Cupric Acetate*

Heptyl aldehyde hemiperacetal

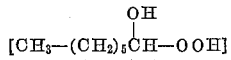

is made by reacting about equal moles of 30% aqueous hydrogen peroxide and heptyl aldehyde in methanol solution and the mixture is chilled, acidified with concentrated sulfuric acid and cupric acetate in methanol and chloroprene are added successively and then ferrous sulfate is introduced dropwise as in Example V. Workup of the reacted mixture gives 1-methoxy-3-chlorodecene-2 and isomers as recoverable products.

By the use of non-alcoholic aqueous media in the foregoing reactions one obtains the corresponding allylic hydroxy compounds instead of the allylic ether compounds shown. From methyl omega-caproate, butadiene, water only and cupric sulfate by the method of Example I, the corresponding products are 8-hydroxy-9-decenoic acid and 10-hydroxy-8-decenoic acid. The reaction of Example II using water as the only solvent gives 3-hydroxy-1-undecen-10-one and 1-hydroxy-2-undecen-10-one as chief products while those from the reaction of Example III similarly modified are 8-hydroxy-8-methyl-9-decenoic acid and 10-hydroxy-8-methyl-8-decenoic acid. The method of Example IV, when omitting ethanol, gives 1-octene-3,8-diol and 2-octene-1,8-diol while the chief product from the reaction of Example V without the methanol is methyl 8-chloro-10-hydroxy-8-decenoic acid and 3-chloro-2-decenol is obtained from the reaction of Example VI when carried out without the methanol.

In the foregoing, emphasis has been placed on redox reaction of peroxides to produce free radicals having the free bond linked to a saturated carbon atom. This constitutes an especially advantageous modification of the invention because of the desirable types of products which can be obtained. However, the redox reaction of peroxides can be carried out in the known way to produce oxy radicals $R_1$—O· which can be used in the new process to make allylic alcohols or ethers containing these R—O groups. The reaction of a typical hydroperoxide R—O—OH can be represented as follows:

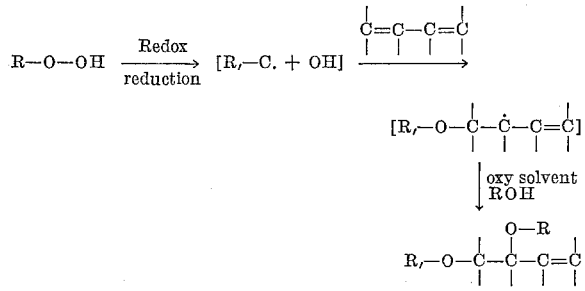

The product is an ether substituted allylic alcohol when the oxy solvent used is water or a diether when the solvent is an alcohol. In both cases there will be an ether group derived from the starting peroxide attached to one of the unsaturated carbon atoms of the starting diene. This modification of the invention is illustrated by the following example:

*Example VII.—Reaction of Tert-Butoxy Radical With Butadiene, Methanol and Cupric Sulfate*

Tert-butyl hydroperoxide (0.18 mole, 97.6% w.) and butadiene (~100 g.) were dissolved in methanol (100 ml.) contained in a three-necked Morton flask equipped with Tru-bore stirrer, addition funnel, thermometer and Dry Ice condenser. After a presweep with nitrogen, cupric-ferrous sulfate solution (0.2:0.2 mole in 260 ml. of water) was added at a rate which would maintain the temperature at ~ —2° C. (ice-salt bath). After 30 minutes at —2°, the reaction mixture was brought gradually to room temperature; unconverted butadiene was distilled into a Dry Ice trap. The reaction mixture was extraced with petroleum ether, dried and distilled through a micro Vigreaux column. Separation was poor and the distilled fractions (sans cut 1, $n_D^{19.7}$ 1.4164; 2.7 g.) were combined and fractionated in a spinning band column:

| Fr. | B.P. (°/100 mm.) | $n_D^{20}$ | Wt. (g.) |
|---|---|---|---|
| 1' | 80–90 | 1.4139 | 1.0 |
| 2' | 90 | 1.4142 | 2.0 |
| 3' | 90 | 1.4142 | 2.6 |
| 4' | 90–110 | 1.4282 | 1.6 |
| 5' | 110–116 | 1.4283 | 0.4 |
| 6' | 116–117 | 1.4280 | 1.2 |
| Bottoms | | 1.4343 | ~0.8 |

The principal component of cut 1 and fractions 1', 2' and 3' was identified by infra-red and gas-liquid chromatography as 1-tert-butoxy-2-methoxy-3-butene which after purification by a silica gel chromatographic column and redistillation was found to have a refractive index $n_D^{20}$ 1.4145.

| Analysis | Carbon, percent | Hydrogen, percent |
|---|---|---|
| Found | 68.6, 68.9 | 11.4, 11.6 |
| Theory for $C_9O_2H_{18}$ | 68.4 | 11.5 |

Fractions 4', 5' and 6' were found to contain 1-tert-butoxy-4-methoxy-2-butene. Infra-red analysis showed absorption at about 5.96μ and a strong "trans" bond at about 10.34. Analysis, calculated for $C_9H_{18}O_2$: Carbon 68.4%, hydrogen 11.5%; found: carbon 68.2% and hydrogen 11.4%.

The structures of the products were confirmed by hydrogenation and removal of the tertiary butyl groups by hydrolysis with 50% sulfuric acid at 70° C., then holding at 55° C. for several hours to obtain 2-methoxy-1-butanol and 4-methoxy-1-butanol, respectively. The combined yield of these products was 55 to 60 mole percent, 66 wt. percent of the product being the 2-methoxy compound and 32% being the trans 1-methoxy compound. About 2% of 2-hydroxy-1-tert-butoxy-3-butene was also identified among these products.

By reaction in the same way using ferrous lactate or other reducing agents such as other salts of polyvalent heavy metals in their lower valence state or sodium bisulfite or ascorbic acid, etc. as the redox reducing agent, together with the same or other cupric salts, the processes of the foregoing examples can be successfully carried out with other organic hydroperoxides or hydroperoxide precursors to produce other allylic alcohol or allylic ether compounds.

As previously indicated, thermal decomposition of peroxide compounds of the structure described above is an alternative method which can be used to produce the intermediate organic free radicals essential to the new method of producing allylic hydroxy or allylic ether compounds. Roedel patent U.S. 2,601,224 describes a method of thermal reaction of peroxides of cyclic compounds which can be successfully employed by conducting the reaction in liquid phase in the presence of a diene, water and/or an alcohol, and cupric ions in the required amount. Any of the peroxides described in the patent can be used as the starting material, as can other peroxides or hydroperoxides previously discussed herein. The thermal decomposition of the chosen starting peroxide compound or mixture is advantageously effected by heating at about 75° to about 220° C. while maintaining the mixture including diene and solvent in liquid phase with dissolved cupric compound used in the proportions previously indicated.

Still another method of generating the organic free radicals necessary for the new process is photolysis by subjecting an organic peroxide or hydroperoxide compound of the previously indicated type or a suitable carbonyl or azo compound to ultraviolet light. The photolysis can be advantageously carried out as described in "Techniques of Organic Chemistry," edited by A. Weissberger, vol. II, pp. 257 ff. In this modification of the invention one can, for example, conduct a liquid mixture, preferably an aqueous mixture, of the chosen starting organic peroxide, carbonyl or azo compound, together with a solution of a cupric salt and an aqueous or alcoholic medium in contact with the diene reactant through a quartz reaction tube which is exposed to ultraviolet radiation. A temperature of about −15° C. to about 200° C. can be employed.

The new type of substituted carboxylic acids and esters which these methods make available vary from liquid to crystalline solid compounds depending on the length of the carbon chain which separates the carboxylic group from the allylic double bond and on the number of carbon atoms in the allylic ether group in the case of the ether derivatives. They are particularly useful starting materials for the production of dienic acids by removal of the hydroxy or ether groups. Thus hydrolysis with dilute aqueous sulfuric acid and pyrolysis at about 500° C. of the isomeric ether-esters of Example I gives decadieneoic acids which are also obtained by dehydration of the ether-acid produced when the reaction of Example I is carried out using water alone as the solvent. In the same way 8-methyl-decadieneoic acid is produced from the isomeric methoxy-8-methyl-decenoic acid esters of Example III. These dienoic acids are readily polymerizable by means of peroxide catalysts due to their conjugated unsaturation. Any of the usual methods of diene polymerization in bulk or in emulsion can be used to obtain polymers which can be cross-linked through the carboxylic acid groups by means of polyols such as ethylene glycol, hexamethylene glycol, etc., to produce solid polymers whose properties can be varied by control of the degree of polymerization. Alternatively the dienoic acids can be copolymerized with other polymerizable ethylenic compounds such as styrene, divinyl benzene, butadiene, methyl methacrylate, vinyl chloride and the like. The products vary from clear, hard resins useful in the manufacture of shaped articles or applied in surface coating to tough elastic products which can be converted advantageously to sheets and/or fibers, particularly when using diisocyanate cross-linking agents for example.

The new hydroxy and alkoxy carboxylic acids of the formula

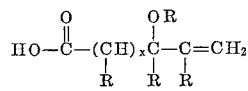

in which $x$ is an integer equal to 4 or 5 and R is hydrogen or an alkyl group of not more than 3 carbon atoms and their esters, alkanol of 1 to 4 carbon atoms, are an especially advantageous subgroup of the new compounds of the invention. Hydroxy acids of this type can be condensed using acid catalysts and preferably removing the water produced as fast as it is formed to make polyesters applicable in surface coating which can be cured through reaction at the active allylic ethylenic bonds in the condensate. The allylic ether acids can be subjected to ether exchange with allyl alcohol using an acid catalyst to produce a triethylenic ether-ester of the unsaturated acid. Epoxidation of two or more of the ethylenic groups gives a polyepoxide which is also useful for polymer production.

It will thus be seen that the invention is capable of considerable variation not only with respect to the methods by which the new reaction can be carried out but also in regard to the new compounds which can be produced. It is therefore not to be limited to the examples which have been given by way of illustration nor by any theory proposed in explanation of the advantageous results which are obtained.

We claim as our invention:

1. An alkoxy-substituted mono-ethylenic carbonyl compound of the group consisting of carboxylic acids having 9 to 18 carbon atoms in the acid moiety and 1 to 5 carbon atoms in the alkoxy group and alkyl esters of said acids having 1 to 5 carbon atoms in the alkyl ester group, the alkoxy group being in allyl position with respect to the ethylenic double bond which is separated from the carboxyl carbon atom by a hydrocarbon radical of 6 to 14 carbon atoms.

2. A compound of the formula

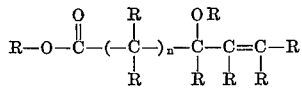

wherein each R represents a member of the group consisting of hydrogen and alkyl radicals of 1 to 4 carbon atoms and $n$ is an integer equal to 5 to 6.

3. Alkyl 8-alkoxy-9-decenoate wherein each of said alkyl groups contains 1 to 4 carbon atoms.

4. Alkyl 10-alkoxy-8-halo-8-decenoate wherein each of said alkyl groups contains 1 to 4 carbon atoms.

5. A method for producing 1-tertiary butoxy-2-alkoxy-butene-3 which comprises reacting tertiary butyl hydroperoxide, a redox reducing agent, butadiene and a lower alkanol in the presence of about 0.01 to about 0.6 equivalents of cupric ion per mole of tertiary butyl hydroperoxide present.

6. A method for producing an ether-substituted mono-ethylenic carboxylic acid ester which comprises reacting a cyclohexanone-hydrogen peroxide reaction product with ferrous ion to generate an omega-caproate radical in the presence of a conjugated hydrocarbon diene of 4 to 10 carbon atoms per molecule, an alcohol solvent for said reactants, and about 0.01 to about 0.6 equivalents of cupric ion per mole of said peroxide reaction product present.

7. A method for producing the methyl ester of methoxy-decenoic acid which comprises reacting cyclohexanone-hydrogen peroxide reaction product, ferrous sulfate, and methanol in the presence of cupric sulfate and butadiene the amount of cupric sulfate being such as to provide about 0.01 to about 0.6 equivalents of cupric ion per mole of said peroxide reaction product present.

8. A method for producing a mono-ethylenic diether having at least one of the ether groups in allylic position with respect to the ethylenic double bond which comprises generating an alkoxy free radical by decomposing an alkyl hydroperoxide by redox reaction with ferrous ion in the presence of
 a conjugated diene, and of a solubilizing alcohol solvent for the reactants containing between about 0.01 and about 0.6 equivalents of cupric ion per mole of alkyl hydroperoxide
whereby combination of said free radical and alcohol solvent with the diene takes place in equal mole proportions.

9. A method for producing a mono-ethylenic allylic oxy compound which comprises reacting an organic free radical of the formula

wherein each R represents a member of the group consisting of hydrogen, hydrocarbon, hydroxyl-substituted hydrocarbon, cyano-substituted hydrocarbon, alkoxy-substituted hydrocarbon, carboxy-substituted hydrocarbon, and halo-substituted hydrocarbon groups containing not more than 10 carbon atoms, which hydrocarbon and substituted hydrocarbon groups are linked to the indicated carbon

by a bond attached to a saturated carbon atom,
 with a conjugated diene and hydroxy solvent for the reactants chosen from the group consisting of water and saturated alcohols miscible with water to the extent of at least 10 parts per 100 parts of water,
in the presence of a solution of cupric compound containing about 0.01 to about 0.06 equivalents of cupric ion per mole of the precursor of said free radical used,
 whereby combination of said organic free radical and hydroxy solvent with said diene takes place in equal mole proportions to form the monomeric mono-ethylenic oxy compound.

10. A method in accordance with claim 9 wherein the organic free radical and a saturated monohydroxy alcohol are reacted with the conjugated diene.

11. A method in accordance with claim 9 wherein the organic free radical and water are reacted with a conjugated hydrocarbon diene having 4 to 10 carbon atoms per molecule.

12. A method for producing a mono-ethylenic allylic oxy carbonyl compound which comprises reacting an organic free radical of the formula

where T is a member of the group consisting of hydroxyl, alkyl, and alkoxy groups containing not more than 4 carbon atoms, and R is a hydrocarbon group of 3 to 11 carbon atoms,
 with a conjugated diene and a hydroxy solvent for the reactants chosen from the group consisting of water and saturated alcohols miscible with water to the extent of at least 10 parts per 100 parts of water,
in the presence of a solution of cupric compound containing about 0.01 to about 0.06 equivalents of cupric ion per mole of the precursor used for said free radical,
 whereby combination of said organic free radical and hydroxy solvent with said diene takes place in equal proportions to form the monomeric mono-ethylenic oxy-substituted carbonyl compound.

13. A method in accordance with claim 12 wherein the organic free radical and a saturated monohydric alcohol are reacted with the diene.

14. A method in accordance with claim 12 wherein the organic free radical and water are reacted with a conjugated hydrocarbon diene of 4 to 10 carbon atoms per molecule.

References Cited in the file of this patent
UNITED STATES PATENTS

| | | |
|---|---|---|
| 2,957,907 | Payne et al. | Oct. 25, 1960 |
| 3,013,068 | De La Mare et al. | Dec. 12, 1961 |

UNITED STATES PATENT OFFICE

CERTIFICATE OF CORRECTION

Patent No. 3,140,303                             July 7, 1964

Harold E. De La Mare et al.

It is hereby certified that error appears in the above numbered patent requiring correction and that the said Letters Patent should read as corrected below.

Column 14, lines 16 and 44, for "0.06", each occurrence, read -- 0.6 --.

Signed and sealed this 17th day of November 1964.

(SEAL)
Attest:

ERNEST W. SWIDER
Attesting Officer

EDWARD J. BRENNER
Commissioner of Patents